L. S. HACKNEY & F. G. HAAS.
TRACTOR TREAD FOR WHEELS.
APPLICATION FILED JUNE 12, 1913.
1,171,044.
Patented Feb. 8, 1916.
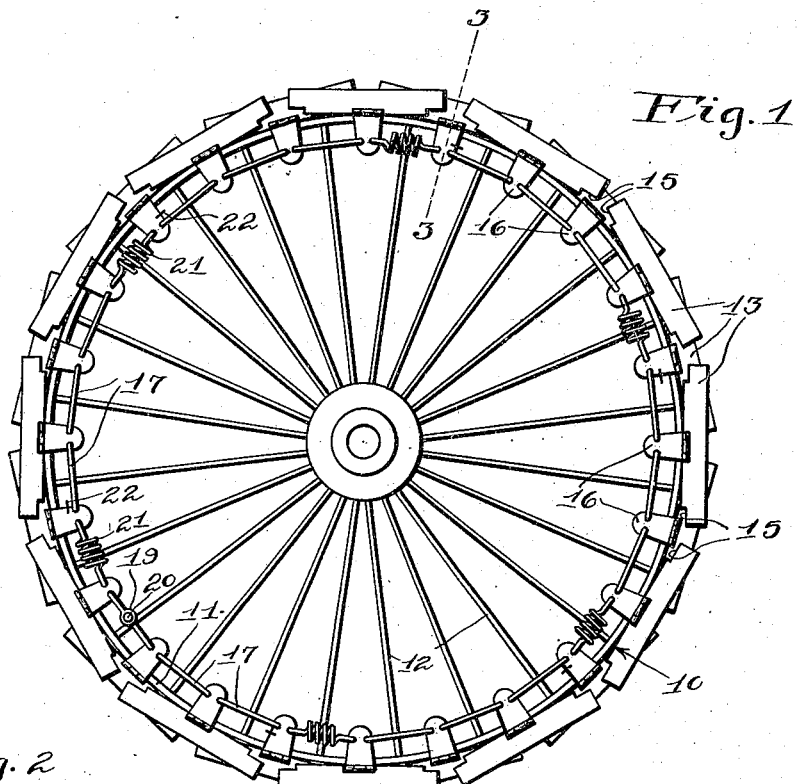
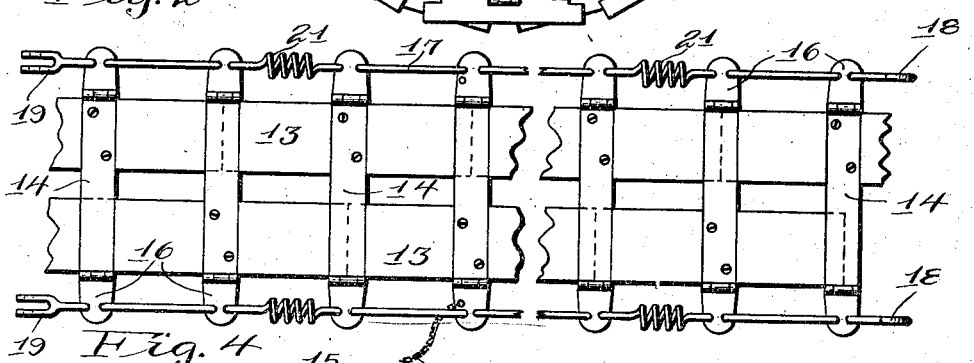
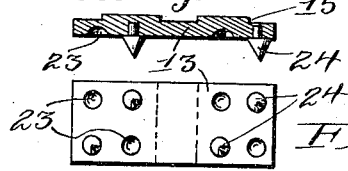
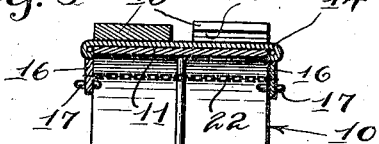
Witnesses
F. C. Caswell
F. M. Hardy
Inventors
Leslie S. Hackney
Ferdinand G. Haas
by John E. Stryker Atty.

UNITED STATES PATENT OFFICE.

LESLIE S. HACKNEY AND FERDINAND G. HAAS, OF ST. PAUL, MINNESOTA; SAID HAAS ASSIGNOR TO SAID HACKNEY.

TRACTOR-TREAD FOR WHEELS.

1,171,044.  Specification of Letters Patent.  Patented Feb. 8, 1916.

Application filed June 12, 1913. Serial No. 773,255.

*To all whom it may concern:*

Be it known that we, LESLIE S. HACKNEY and FERDINAND G. HAAS, citizens of the United States, residing at St. Paul, in the county of Ramsey and State of Minnesota, have invented new and useful Improvements in Tractor-Treads for Wheels, of which the following is a specification.

Our invention relates to improvements in tractor treads for wheels.

Its object is to provide a simple, durable and efficient device of this kind, adapted to furnish a relatively large bearing surface for an ordinary tractor wheel, so arranged as to be quickly and easily applied thereto or detached therefrom.

In the drawing, Figure 1 is a side elevation of a wheel supplied with our improved tractor tread; Fig. 2 is a plan view in detail illustrating portions of the tread detached from the wheel and in extended position; Fig. 3 is a detail sectional view taken on the line 3—3 of Fig. 1; Fig. 4 is a longitudinal sectional view of one of the tread plates, and Fig. 5 is a bottom view of said plate.

Referring to the accompanying drawing, we have used the reference numeral 10 to indicate a tractor wheel of the ordinary well-known design having a flat rim 11 and radial spokes 12. Our improved tread, which is well adapted for such wheels, consists of two or more series of tread plates 13, each series being arranged in staggered relation to the other, around the periphery of the wheel 10; these plates are mounted upon the straps 14, which rest at intervals transversely on the rim 11 of the wheel 10. The tread plates 13 overlap the adjacent straps 14 and the ends of said plates are notched at 15 to conform to said adjacent straps. A lug 16, hinged on each end of each strap 14, folds inwardly and forms a stop to prevent lateral movement of the strap on the rim of the wheel. The straps 14 are equally spaced apart by a series of links 17, the links of one series being pivotally attached to the lugs 16 at one side of the tread and the links of a second series being similarly attached to the lugs at the other side of the tread. A link 17 in each series, formed with an eye 18 and clevis 19, is provided with a pin 20 for detachably securing the end links of the series together. Intermediate links at intervals within said series include coiled springs 21 between their ends, which normally hold the tread snugly on the wheel but yield when the straps 14 are disarranged by the tilting of the tread plates. Detachable anti-creeping chains 22 are arranged at intervals within the rim of the wheel 10 extending from one lug 16 to the corresponding lug on the other end of the same strap. These chains engage the spokes of the wheel 10 and prevent said wheel from turning within the tread. Cuplike depressions 23 may be formed in the bearing surfaces of the tread plates 13, and lugs 24 may be secured on said surfaces to insure more efficient contact between the road and the plates 13.

In operation, the inner faces of the tread plates 13 and straps 14 form an even and continuous bearing for the revolving wheel. The tread plates 13 tilt as their ends engage the road surface. At least three of said plates are at all times in contact with the earth and form a large bearing surface, which aids materially in the transmission of power. The tread is easily detached from the wheel by removing the pins 20 from the eyes 18 and clevises 19 and detaching the anti-creeping chains 22 from the lugs 16. To apply the device, one end of the tread is extended upon the ground and the rim of the wheel is placed thereon. Said end is then held upon the rim of the wheel which is revolved until the ends of the tread meet; the lugs 16 having been turned inwardly at right angles to the plates 13 as said tread is applied to the rim. The series of connecting links 17 at each side of the tread are joined at their ends, after which the anti-creeping chains 22 are secured in position.

Having described our invention, what we claim as new and desire to secure by Letters Patent, is:

1. A tread, adapted to be placed upon a flat rimmed wheel, comprising a succession of staggered tread plates, a strap secured to each plate and resting transversely on said rim and connecting members uniting the ends of said straps to join the same in an independent detachable series about the rim of the wheel.

2. The combination with the rim of a wheel, of a succession of tread plates notched at their ends and arranged in staggered relation around the periphery of the wheel, a strap secured to each plate and forming a mounting therefor and attaching elements connecting the straps, the notched ends of said plates being adapted to overlap and conform to the adjacent straps.

3. The combination with a wheel, of a series of tread plates arranged in staggered relation around the periphery of the rim of said wheel, a strap forming a mounting for each plate and formed with lugs overlapping the edge of said rim, a series of links on each side of the wheel connecting said lugs in succession and means, such as chains, extending between a plurality of said lugs and across said wheel for engaging the spokes thereof.

4. In a tractor tread for wheels, a plurality of tread plates arranged in staggered relation, straps secured to and forming a mounting for said plates, lugs on said straps and links connecting said lugs, a plurality of said links including springs adapted to form a yielding attaching medium for said straps.

5. A tread, adapted to be placed upon the rim of an ordinary wheel, comprising a succession of staggered tread plates, a mounting for each plate resting transversely on said rim, means for yieldingly uniting the ends of said mountings to join the same in an endless series and means to prevent the slipping of the tread upon said rim.

In testimony whereof, we have signed our names to this specification in the presence of two subscribing witnesses.

LESLIE S. HACKNEY.
FERDINAND G. HAAS.

Witnesses:
A. C. FRENCH,
LOUIS JOHNSON.

Copies of this patent may be obtained for five cents each, by addressing the "Commissioner of Patents, Washington, D. C."